(12) United States Patent
Piole et al.

(10) Patent No.: US 6,501,026 B1
(45) Date of Patent: Dec. 31, 2002

(54) ACCESSORY ADAPTED TO BE ATTACHED TO A BASE SECTION OF TRUNKING FOR ROUTING ELECTRICAL CABLES

(75) Inventors: David Piole, Avoise; Bertrand Decore, La Chapelle Saint Aubin, both of (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/685,962

(22) Filed: Oct. 16, 2000

(30) Foreign Application Priority Data

Oct. 15, 1999 (FR) .............................. 99 12922

(51) Int. Cl.[7] ................................. H02G 3/06
(52) U.S. Cl. ...................... 174/99 R; 174/48; 174/68.3; 174/101; 138/155; 138/162; 138/163
(58) Field of Search ........................ 174/48, 67, 68.3, 174/70 C, 72 C, 95, 97, 99 R, 101; 52/287, 288.1; 138/115, 155, 162, 163

(56) References Cited

U.S. PATENT DOCUMENTS

| | | | | |
|---|---|---|---|---|
| 3,562,402 A | | 2/1971 | Dwyer | |
| 3,786,171 A | * | 1/1974 | Shira ........................... | 174/48 |
| 4,077,434 A | * | 3/1978 | Sieckert et al. .............. | 138/155 |
| 4,349,220 A | * | 9/1982 | Carroll et al. ............... | 138/163 |
| 4,952,163 A | * | 8/1990 | Dola et al. ..................... | 174/48 |
| 5,024,614 A | * | 6/1991 | Dola et al. ..................... | 174/48 |
| 5,435,606 A | * | 7/1995 | Navazo ....................... | 138/155 |
| 5,726,387 A | * | 3/1998 | Teinturier et al. ........... | 174/68.3 |
| 5,756,933 A | * | 5/1998 | Pitchford et al. ............. | 174/48 |
| 6,194,662 B1 | * | 2/2001 | Smith ........................... | 174/67 |
| 6,222,120 B1 | * | 4/2001 | Albert et al. .................. | 174/48 |
| 6,252,171 B1 | * | 6/2001 | Barr ............................. | 174/95 |

FOREIGN PATENT DOCUMENTS

| | | | |
|---|---|---|---|
| EP | 0 933 852 A1 | | 8/1999 |
| FR | 2 651 387 | | 3/1991 |
| FR | 2 772 200 | | 6/1999 |
| GB | 2137025 A | * | 9/1984 |
| GB | 2254966 A | * | 10/1992 |

* cited by examiner

*Primary Examiner*—Dean A. Reichard
*Assistant Examiner*—Adolfo Nino
(74) *Attorney, Agent, or Firm*—Young & Thompson

(57) ABSTRACT

An accessory to be attached to a base section of trunking for routing electrical cables is provided with a wall for concealing, inside the trunking, any longitudinal gap beyond an edge of at least one length of cover section. The wall has an effacable projecting finger on the front. Applications include the fitting of electrical devices.

23 Claims, 3 Drawing Sheets

ACCESSORY ADAPTED TO BE ATTACHED TO A BASE SECTION OF TRUNKING FOR ROUTING ELECTRICAL CABLES

BACKGROUND OF THE INVENTION

1. Field of the Invention

The present invention relates generally to accessories adapted to be attached to a base section of trunking for routing electrical cables, and in particular to so-called "finishing" accessories providing continuous protection of the cables where there are interruptions in the lengths of trunking closure cover section where a device is fitted, or at the end of the trunking, or at a corner.

The invention relates more particularly to an accessory adapted to be attached to a base section of trunking for routing electrical cables provided with a wall for concealing, inside the trunking, any longitudinal gap beyond at least one edge of at least one length of cover section.

2. Description of the Prior Art

French patent No. 89 11267, publication No. 2 651 387, describes an accessory of the above type, commonly referred to as a cover section joint, including a plane wall adapted to be positioned under adjacent lengths of cover section to close the gap that can occur between the cut edges of the cover sections if the lengths of cover section are not cut perfectly.

A cover section joint of the above kind prevents an object passing between the two lengths of cover section and provides continuous insulation so that the trunking continues to comply with the applicable standards.

Although a cover section joint of the above kind is entirely satisfactory, in particular in terms of the trunking complying with the applicable standards, and also in terms of the speed of fitting for trunking installers, who attach great importance to this parameter, it is not always satisfactory from the aesthetic point of view, especially if the trunking is relatively wide.

In this case the lengths of closure cover section are also relatively wide and all the more difficult to cut because the cut edge can be more askew.

Accordingly, the gap between the two juxtaposed lengths of cover section can be relatively large, clearly showing the cover section joint, so that the finished appearance of the trunking is somewhat unaesthetic.

To overcome the aforementioned problem it has already been proposed, especially in the case of relatively wide trunking, to associate the cover section joint with a joint cover covering the joint and the cut is edge(s) of the length(s) of cover section, which can then be cut without requiring the installer to take undue care.

To facilitate fitting the joint cover, a joint cover support is used which generally includes, at each end to be covered by a length of cover section, a step extending across its entire width and against which the cover section abuts.

A support of the above kind is described in particular in French patent application No. 97 15282, publication No. FR 2 772 200.

A solution of the above kind is satisfactory in terms of the system complying with the applicable standards, and also from the aesthetic point of view if the joint cover reproduces the external appearance and colorway of the cover section of the trunking.

However, if the cover section of the trunking carries a decorative pattern formed either when extruding it or by reworking it, for example by applying a covering imitating various textures, such as the textures of wood, stone or other materials, the presence of an injected joint cover at the interruption in the cover section, even if its colorway is coordinated with that of the decoration of the cover section, is not always to the taste of the installer, who will prefer to fit contiguous lengths of cover section cut carefully to the appropriate length.

U.S. Pat. No. 3,562,402 describes a joint to be positioned between two lengths of cover section, with no joint cover, the joint having substantially the shape of a podium with a junction part flush with the outside surface of the lengths of cover section and a sealing part under the lengths of cover section.

The junction part, which can constitute an abutment surface for an edge of a length of cover section, is bolted to the sealing part. Thus it cannot be removed at will, for example to fit contiguous lengths of cover section.

Compared to the aforementioned prior art, the present invention proposes a new accessory, adapted to be attached to a base section of trunking for routing cables, which is simple to manufacture, of low cost, and which provides the installer with a marker for positioning the cut edges of lengths of cover section or other elements to be juxtaposed along the length of the base section, enabling the cut edges to be covered with a joint cover, or not, according to the care that the installer wishes to take in cutting the cover section or other elements to lengths, and according to the required aesthetics of the installation as a whole.

SUMMARY OF THE INVENTION

According to the invention, the accessory adapted to be attached to a base section of trunking for routing cables is more particularly provided with a wall for concealing, inside the trunking, any longitudinal gap beyond an edge of a length of a cover section, the wall including an effacable projecting finger at the front, i.e. a finger adapted to be cut off or bent.

Thus, in accordance with the invention, when there is an interruption in the closure cover section of the trunking that requires an installer to cut the cover section to length, and if the installer wishes Lo install a joint cover, the projecting finger on the wall of the accessory mounted on the base section is used to measure the appropriate lengths of cover section to be cut, so that the cut edges of the lengths of cover section, when mounted on the base section of the trunking, are located against the projecting finger, there remaining between them at most a gap the same width as the finger.

Clipping means of the joint cover can then be passed through the gap to attach the joint cover to the accessory.

If the installer does not wish to use a joint cover, it is easy to cut off the projecting finger using a cutting tool such as side cutters, a knife or a saw.

Other advantageous and non-limiting features of the accessory according to the invention are stated hereinafter.

The finger is formed in one piece with the wall and is adapted to be bent.

This latter feature is particularly advantageous if the installer cuts a length of cover section so that it abuts edge-to-edge with another element juxtaposed to it along the length of the base section. In this case, when fitting the length of cover section to the trunking, the projecting finger of the accessory mounted on the trunking is pushed back under the length of cover section covering the accessory.

A hinge of the finger can be operative between one edge thereof and one edge of a window in the wall receiving the finger.

The finger can advantageously include on one free edge at least one lug adapted to abut against the rib provided on the wall to immobilize the finger when it has been effaced.

The joint cover according to the invention can have on an inside face that faces towards the wall of the accessory a rib adapted to push the finger back into the wall when it is fitted.

In another embodiment of the invention, the joint cover can have on its inside face that faces towards the wall of the accessory a housing to receive the projecting finger of the wall when it is fitted.

The accessory according to the invention can constitute a cover section joint mounted transversely on the base section of the trunking to assure continuity between two overlying lengths of cover section and can also constitute a trunking termination with a flange carrying the wall so that it is transverse to the flange.

Finally, it can also constitute a corner, a branch or a support for mounting an electrical device to be attached to the base section of the trunking.

The following description with reference to the accompanying drawings, which are given by way of non-limiting example, explains in which the invention consists and how it can be put into effect.

DETAILED DESCRIPTION OF THE PREFERRED EMBODIMENTS

First note that in the various embodiments of the invention shown in the figures, identical or similar parts are whenever possible identified by the same reference numbers and are not described again each time.

Figure 1:
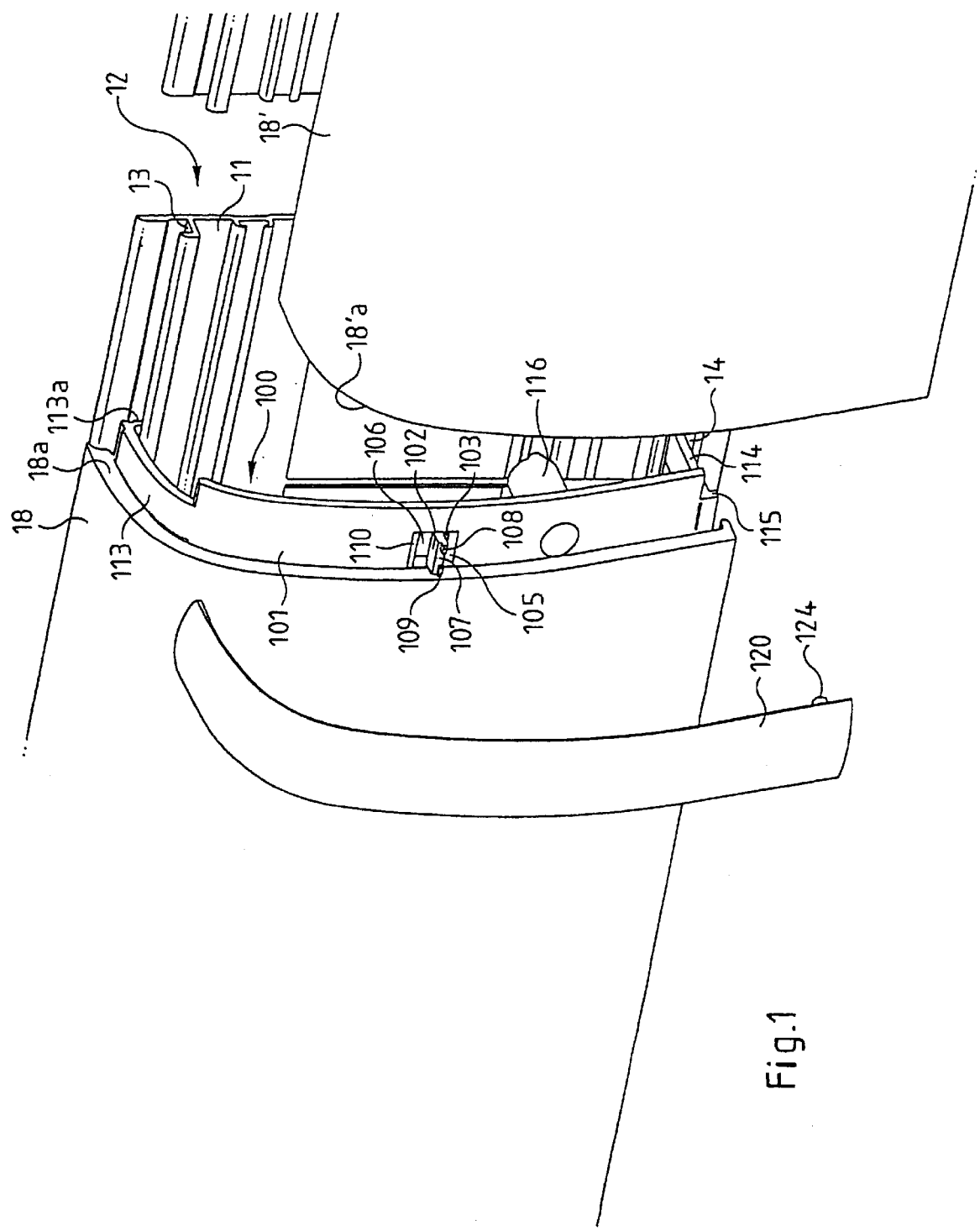
FIG. 1 is a perspective view of a system including an accessory according to the invention attached to a base section of trunking closed by two lengths of closure cover section juxtaposed at the location of the accessory.
Figure 3:
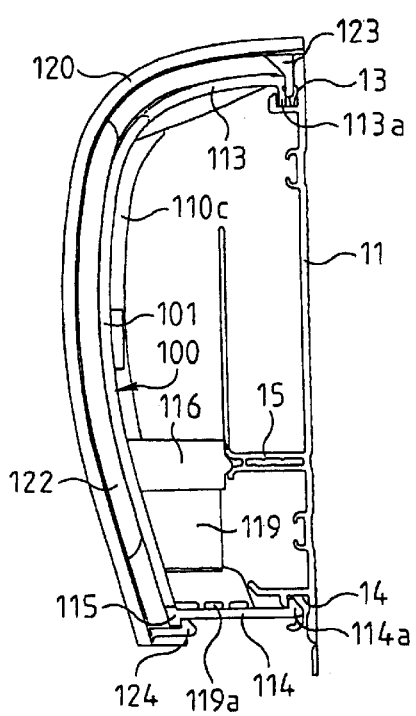
FIG. 3 is a diagrammatic side view of the accessory and joint cover of FIGS. 2a and 2b mounted on the base section of the trunking.

FIGS. 1 and 3 show trunking 12 for routing electrical cables, not shown.

Trunking of this kind, which is known in the art, supports, houses and protects various devices, in particular various electrical devices, and houses conductors providing the electrical connections to such devices.

In the usual way it includes a base section 11 which in this example is essentially straight and has inside it a number of troughs defining various compartments or channels for housing the electrical cables and fitting various devices or electrical device supports.

In this example the trunking 12 is closed by two lengths of cover section 18, 18' which have a curved profile and carry on their inside surface means adapted to interengage with complementary means on the base section 11, which means are known in the art and will not be described in detail here.

As shown in FIGS. 1 to 5, a finishing accessory 100 is provided at the interruption of the two lengths of cover section 18, 18'. In this example it is a cover section joint attached to the base section 11 of the trunking 12 to assure continuous protection of electrical cables between the two lengths of cover section 18, 18'.

As shown in FIGS. 2a, 2b, 3, 4a and 4b in particular, the accessory 100 has a wall 101 for concealing, inside the trunking, any longitudinal gap between the two cut edges 18a, 18'a of the lengths of cover section 18, 18'.

In the typical example shown in the figures, the wall 101 of the accessory has on each transverse end edge 111, 112 a clip 113, 114 which carries a rib 113a, 114a adapted to be inserted elastically into a trough 13, 14 in the vicinity of each longitudinal edge of the base section 11 of the trunking 12. Thus the cover section joint is mounted transversely on the base section 11, in the same manner as the lengths of cover section 18, 18'.

In this example the wall 101 of the accessory 100 has a curved profile and one of the clips 113 has an identical curved profile, continuous with that of the wall, so that the clip 113 forms a drooping edge of the wall. The drooping edge 113 has the advantage of stiffening the wall 101 of the accessory.

The other clip 114 is essentially perpendicular to the wall 101 and has a straight profile.

There is a stiffener rib 110c on one longitudinal edge of the rear face 101b of the wall 101 of the accessory 100. There is also a stiffener rib 110d on one longitudinal edge of the clip 113 of the accessory. The two ribs 110c, 110d are substantially in line with each other on the same side of the accessory.

The wall 101 advantageously has a projecting finger 102 on its front face 101a.

The finger 102 is molded in one piece with the wall 101. It is preferably effacable.

To this end, there is a hinge 103 for articulating the finger 102 between an edge 104 of the finger (see FIG. 5 in particular) and an edge 105 of a window 106 in the wall 101 accommodating the finger.

The hinge 103 for articulating the finger 102 is an integral spring tongue extending over a portion of a circle.

Figure 4A:
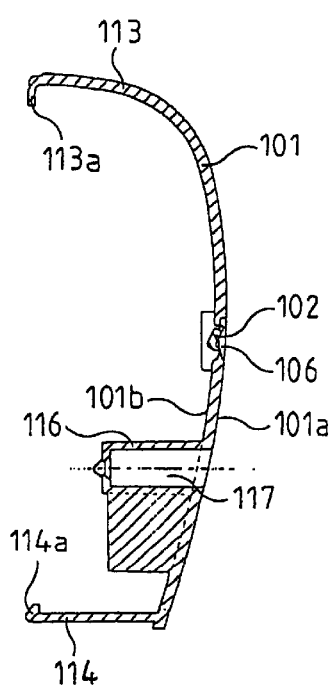
FIGS. 4a and 4b are views of the accessory from FIG. 1 in section in a vertical plane passing through the center of the projecting finger of the accessory, respectively when the finger has been pushed back and when it is projecting.
Figure 4B:
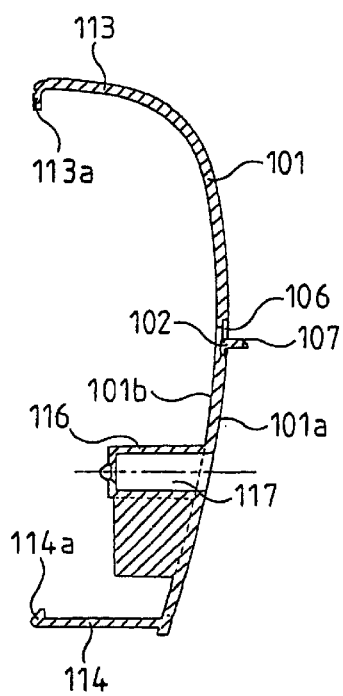
Figure 5:
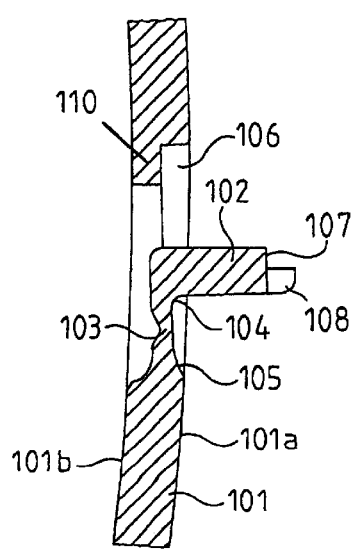
FIG. 5 is a detail view of the projecting finger of the accessory according to the invention.

As shown in FIGS. 1 and 5, the finger 102 of the wall 101 of the accessory 100 has two effective heights relative to said front face, a first effective height extending substantially above the lever of said front face and a second effective height proximate to a level of said front face, and at least one lug, in this example two lugs 108, 109, on a free edge 107 adapted to abut against rib 110 on the wall 101 to immobilize the finger when it has been effaced, such as shown in FIG. 4a.

The rib 110 extends from one edge of the window 106 towards the inside of the window and is positioned substantially halfway across the thickness of the wall 101 so that when the finger 102 has been effaced the finger 102 is not pressed too deeply into the wall 101 and the hinge 103 is still loaded elastically.

In accordance with the invention, and as can be seen in FIGS. 1, 2a, 2b, and 3, a joint cover 120 covers the wall 101 of the accessory 100 and the edges 18a, 18'a of the lengths of cover section 18, 18' adjacent respective opposite sides of the finger to form a continuous outside wall between the two lengths of cover section 18, 18' and to improve the aesthetics of the finished assembly.

Naturally, in different embodiments, the joint cover could cover the wall of the accessory positioned between an edge of a length of cover section and an edge of another element, such as a trunking termination (see FIG. 6) or an electrical device support, the edges of the length of cover section and of the other element being positioned adjacent respective opposite sides of the finger.

In this example the joint cover 120 has a curved profile which mates with that of the wall 101 on the accessory 100 and is positioned edge-to-edge with the two lengths of cover section 18, 18' to ensure perfect continuity between them of the outside wall of the closed trunking.

The width of the finger 102 of the accessory is advantageously chosen to leave between the adjacent edges 18a, 18'a of two lengths of cover section 18, 18' a sufficiently large gap to allow the joint cover 120 to be clipped to the wall 101 of the accessory 100.

To this end, the joint cover 120 has clips 123, 124 at each end of its inside face 121. Where the clip 114 and the wall 101 join, the accessory 100 has a small rim 115 projecting in the longitudinal direction of the accessory for clipping a clip 124 of the joint cover. Also, the other clip 123 of the joint cover is adapted to be inserted elastically into the longitudinal trough 13 of the base section 11, between the latter and the rib 113a on the clip 113 of the accessory 100.

The joint cover 120 has a central rib 122 on its inside face 121 which extends over a portion of its length and which effaces the projecting finger inside the wall 101 when it is fitted to the accessory 100.

Figure 2A:
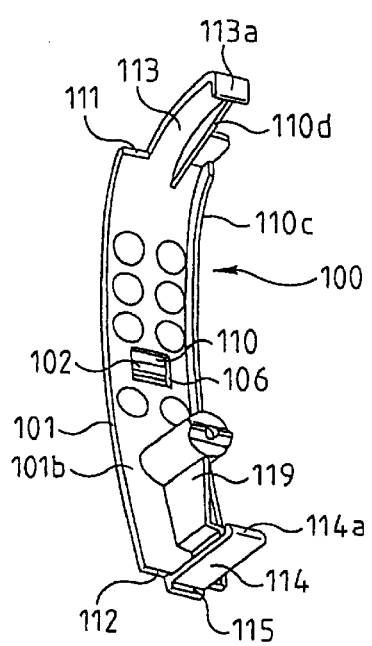
FIGS. 2a and 2b are an exploded bottom view of the accessory from FIG. 1 and its joint cover.
Figure 2B:
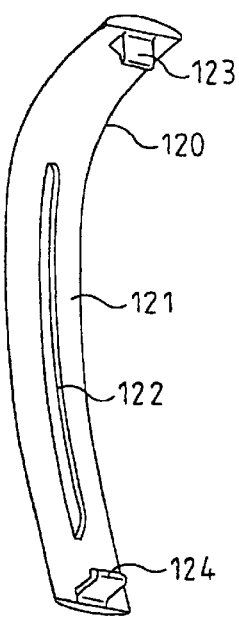

Of course, if the projecting finger of the accessory is not effacable, the joint cover can include a longitudinal stiffener rib like that shown in FIG. 2b with a housing adapted to receive the finger projecting from the wall of the accessory when it is fitted to the latter.

Also, the accessory 100, in this instance the cover section joint shown in FIGS. 1 to 4b, includes a column 116 extending from the rear face 101b of the wall 101 towards the inside of the trunking. A passage 117 through the column 116 is open at each end and forms a well adapted to receive a screw for fixing the cover section joint to the trunking when it is intended to use the cover section joint without the associated joint cover.

As shown in FIG. 3 in particular, the column 116 has at its free end a centering lug intended to locate in a receiving taper of a housing 15 for receiving a fixing screw which is formed on the base section 11 of the trunking 12 so that when the accessory 100 is fitted to the base section 11 the column 116 is correctly positioned relative to the housing 15 receiving the screw fixing the accessory to the base section.

There is a bayonet stiffener rib 119 between the column 116 and the clip 114 of the accessory 100.

Where the rib 119 joins onto the clip 114, holes 119a are provided to facilitate cutting the clip 114 in order to use the cover section joint 100 without the associated joint cover.

In the embodiment shown, when an installer intends to use the cover section joint 100 without the joint cover and to abut the two lengths of cover section edge-to-edge, covering the cover section joint, the two clips 113, 114 are cut off the cover section joint 100 which is fixed to the base section by means of a screw inserted into the column 116 and into the housing 15 receiving the screw and provided for this purpose on the base section of the trunking. The cover section joint 100 is then placed between the two lengths of cover section 18, 18', which have been cut to the correct length, which push the projecting finger back into the thickness of the wall 101 of the cover section joint.

As clearly shown in the figures, cutting off the clips 113, 114 of the cover section joint 100 enables it to locate easily under the lengths of cover section 18, 18', as described above.

Figure 6:
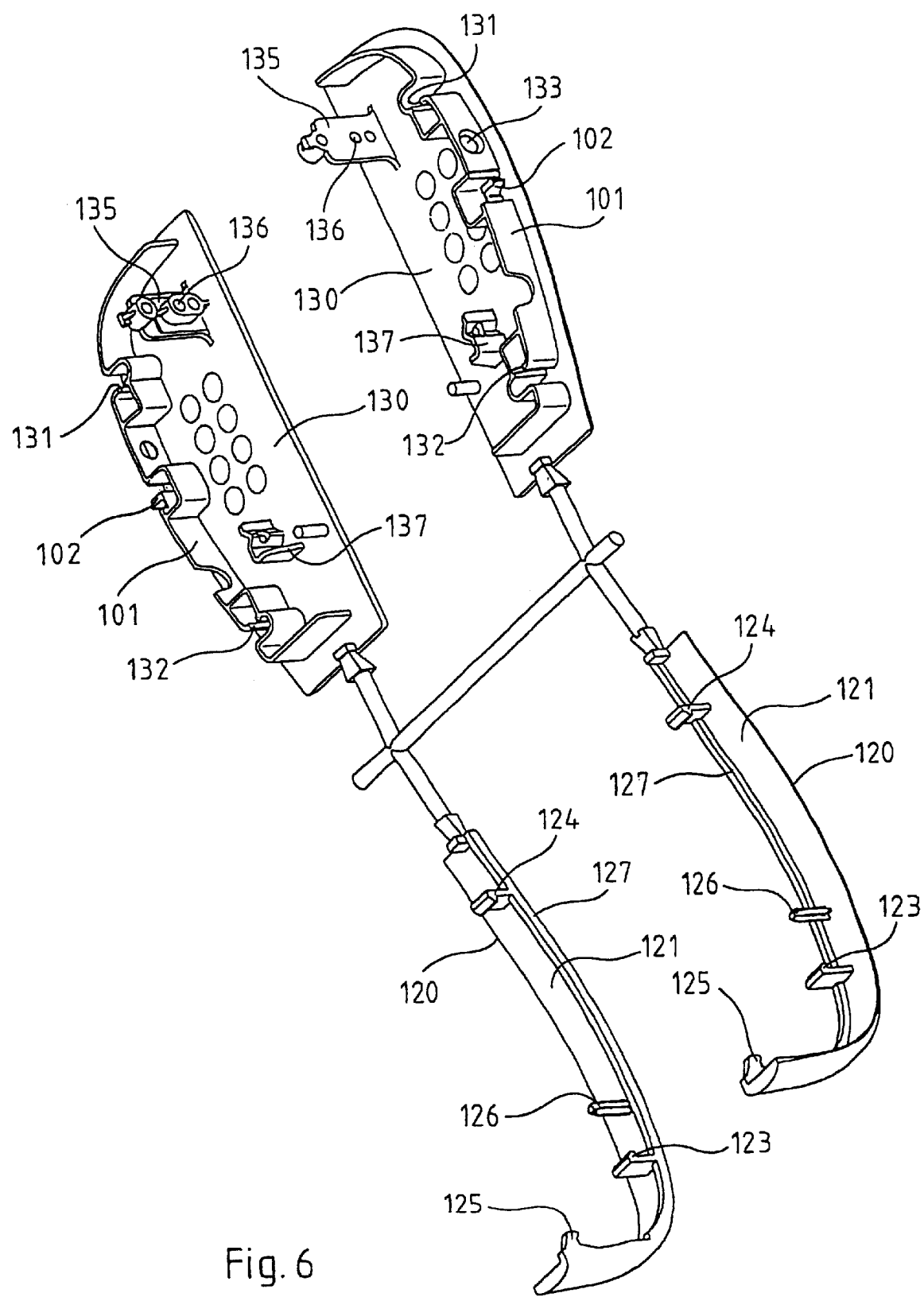
FIG. 6 is a diagrammatic bottom view of two trunking terminations according to the invention and their joint cover on a molding sprue.

FIG. 6 shows on a molding sprue another embodiment of the accessory according to the invention, consisting of two trunking terminations, namely a right-hand termination and a left-hand termination. Each termination includes a flange 130 adapted to close one end of the trunking and which carries on its inside face the wall 101 provided with the projecting finger 102.

The projecting finger 102 can again be pushed back inside the thickness of the wall 101, which to this end includes a window for receiving the finger and provided with the abutment rib for the finger 102 when it has been effaced, as previously described.

The wall 101 of each termination extends transversely to the flange 130. It also includes clipping means of a joint cover 120 equivalent to the joint cover previously described with reference to FIGS. 1 to 3. Here the clipping means include detents 131, 132 formed in the wall 101 cooperating with clips 123, 124 projecting from the inside wall 121 of the joint cover 120.

As shown in FIG. 6, the wall 101 of each termination is adapted to be inserted between one end of the cover section and the base section of the trunking. The termination is fixed by means of fixing lugs 135, 137 incorporating orifices 136 for fixing screws.

Also, each wall 101 of each termination includes means for retaining the joint cover 120 laterally. The lateral retaining means include an orifice 133 adapted to receive a stud 126 projecting from the inside face 121 of the joint cover 120.

The joint cover 120 shown in FIG. 6 has a curved profile identical to that of the cover section closing the trunking, to provide a continuous wall between the curved outside edge of the flange of the termination and the end of the length of cover section.

A longitudinal stiffener rib 127 on one longitudinal edge of the joint cover follows the profile of the joint cover.

Finally, the joint cover 120 shown in FIG. 6 includes, in addition to the clips 123, 124 on the termination, a clip 125 at the curved end of the joint cover adapted to be inserted into a trough of the base section of the trunking provided for fitting a length of cover section.

Of course, the termination as shown in FIG. 6 can be used without the joint cover. In this case, the length of cover section covers the wall 101 of the termination and effaces the projecting finger 102 so that the cut end edge of the cover section locates against the outside edge of the flange of the termination.

The present invention is in no way limited to the embodiment described and shown, to which the skilled person will know how to apply any variant within the spirit of the invention.

There is claimed:

1. An accessory for attachment to a base section of a trunking for routing electrical cables, the accessory having a wall for concealing, inside said trunking, a longitudinal gap beyond an edge of at least one length of a cover section, said wall having a front face facing away from the base section when the wall is attached to the base section, said wall having a projecting finger on said front face, wherein said projecting finger has two effective heights relative to said front face, a first effective height extending substantially above the level of said front face and a second effective height proximate to a level of said front face.

2. The accessory claimed in claim 1 wherein said projecting finger is formed in one piece with said wall.

3. The accessory claimed in claim 1 wherein said projecting finger can be cut off.

4. The accessory claimed in claim 1 wherein said finger can be bent.

5. The accessory claimed in claim 4 including a hinge for articulating said finger between one edge of said finger and one edge of a window in the wall receiving said finger.

6. The accessory claimed in claim 4 wherein said finger has on a free edge at least one lug that abuts against a rib provided on said wall to immobilize said finger when it has been retracted.

7. The accessory claimed in claim 1 including a joint cover adapted to cover said wall and the edge of said length of cover section and an edge of another element adjacent respective opposite sides of said finger to form a continuous outside wall between said length of cover section and said element.

8. The accessory claimed in claim 7 wherein said finger has a width such that it leaves a sufficient gap between said edges to enable said joint cover to be clipped to said wall.

9. The accessory claimed in claim 7 wherein said joint cover has on an inside face that faces towards said wall a rib adapted to push said finger back inside a thickness of said wall when it is fitted.

10. The accessory claimed in claim 7 wherein said joint cover has on an inside face that faces towards said wall a housing for receiving said projecting finger of said wall when it is fitted.

11. The accessory claimed in claim 1 constituting a joint cover section mounted transversely on said base section of said trunking to assure continuity between two overlying lengths of cover section.

12. The accessory claimed in claim 11, wherein said joint cover section has transverse end edges and a clip at each of said transverse end edges which has a rib inserted elastically into a trough of said base section of said trunking.

13. The accessory claimed in claim 12 wherein one of said clips has a curved profile to provide a continuous profile with said wall carrying said projecting finger so that said clip forms a drooping edge of said wall.

14. The accessory claimed in claim 11 wherein said wall comprises a column with a passage that receives a screw for fixing said wall to said base section of said trunking.

15. The accessory claimed in claim 1 constituting a trunking termination with a flange carrying said wall so that it is transverse to said flange.

16. The accessory claimed in claim 15 wherein said wall includes means for clipping on a joint cover adapted to provide a continuous wall between an outside edge of said flange of said termination and an end of said length of cover section and means for laterally retaining said joint cover clipped to said wall.

17. The accessory claimed in claim 16 wherein said means for clipping include detents cooperating with clips carried by an inside face of said joint cover and said means for laterally retaining include a hole receiving a stud projecting from the inside face of said joint cover.

18. The accessory claimed in claim 1 wherein said projecting finger is retractable from its first effective height to its second effective height.

19. An accessory for attachment to a trunking for routing electrical cables, the accessory comprising a wall for concealing a gap beyond an edge of a cover for the trunking and that has a window on a front surface thereof, an effacable finger projecting from said front surface, and a hinge for pivotally attaching said finger to an edge of said window.

20. An accessory for attachment to a trunking for routing electrical cables, the accessory comprising a wall for concealing a gap beyond an edge of a cover for the trunking, an effacable finger projecting from a front surface of said wall, and a joint cover that covers said wall, said joint cover having an inside face facing said front surface of said wall and a rib on said inside face that pushes said finger inside a thickness of said wall.

21. An accessory for attachment to a trunking for routing electrical cables, the accessory comprising a wall for concealing a gap beyond an edge of a cover for the trunking, an effacable finger projecting from a front surface of said wall, and a joint cover that covers said wall, said joint cover having an inside face facing said front surface of said wall and a housing on said inside face that receives said finger.

22. An accessory for attachment to a trunking for routing electrical cables, the accessory comprising a wall for concealing a gap beyond an edge of a cover for the trunking, an effacable finger projecting from a front surface of said wall, and a flange transverse to said wall that terminates an end of the trunking.

23. The accessory of claim 21, further comprising a joint cover with clips that attach said joint cover to said wall, said joint cover covering a space between said flange and the edge of the cover.

* * * * *